(12) United States Patent
Dietrich et al.

(10) Patent No.: US 10,731,737 B2
(45) Date of Patent: Aug. 4, 2020

(54) ANGLE-MEASURING DEVICE FOR A ROTATIONALLY DRIVEN LINEAR ACTUATOR

(71) Applicant: SCHAEFFLER TECHNOLOGIES AG & CO. KG, Herzogenaurach (DE)

(72) Inventors: Markus Dietrich, Oberkirch (DE); Laszlo Man, Ottersweier-Unzhurst (DE); Peter Greb, Ottersweier (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 263 days.

(21) Appl. No.: 15/756,215

(22) PCT Filed: Aug. 24, 2016

(86) PCT No.: PCT/DE2016/200392
§ 371 (c)(1),
(2) Date: Feb. 28, 2018

(87) PCT Pub. No.: WO2017/036476
PCT Pub. Date: Mar. 9, 2017

(65) Prior Publication Data
US 2018/0245675 A1 Aug. 30, 2018

(30) Foreign Application Priority Data
Aug. 28, 2015 (DE) .................. 10 2015 216 509

(51) Int. Cl.
*F16H 25/20* (2006.01)
*G01D 5/14* (2006.01)
(Continued)

(52) U.S. Cl.
CPC .......... *F16H 25/2015* (2013.01); *F15B 7/08* (2013.01); *F16D 23/12* (2013.01); *F16D 48/064* (2013.01);
(Continued)

(58) Field of Classification Search
CPC ........ F16H 25/2015; F16H 2025/2078; G01D 5/145; F16D 23/12; F16D 2023/123;
(Continued)

(56) References Cited

U.S. PATENT DOCUMENTS 8,657,095 B2   2/2014 Eich
9,051,974 B2   6/2015 Gramann et al.
(Continued)

FOREIGN PATENT DOCUMENTS

CN   102046408 A   5/2011
CN   102834636 A   12/2012
(Continued)

OTHER PUBLICATIONS

International Search Report for International Application No. PCT/DE2016/200392 dated Dec. 23, 2016.

*Primary Examiner* — Jacob S. Scott
*Assistant Examiner* — Lori Wu
(74) *Attorney, Agent, or Firm* — Brooks Kushman P.C.

(57) ABSTRACT

An angle-measuring device is provided for a rotationally-driven linear actuator, which can be implemented into a clutch actuator. A rotor element has an axis of rotation and rotates concentrically with a rotor of a rotary drive for an axially movable linear actuator element. A measurement magnet arrangement is fixed relative to the rotor element and has a polarization. The polarization is oriented in such a way that the magnetic field lines can change with a rotation of the rotor element so as to enable the angle to be precisely determined from at least one measurement position. At one location, a 360-degree sensor is provided for measuring angular positions based on the measurement magnet arrangement. At another location, a revolution-counting sensor is provided for counting a number of revolutions carried out based on the measurement magnet arrangement.

9 Claims, 3 Drawing Sheets

(51) Int. Cl.
*F16D 48/06* (2006.01)
*F15B 7/08* (2006.01)
*F16D 23/12* (2006.01)

(52) U.S. Cl.
CPC ....... *G01D 5/145* (2013.01); *F16D 2023/123* (2013.01); *F16D 2500/1024* (2013.01); *F16D 2500/3021* (2013.01); *F16H 2025/2078* (2013.01)

(58) Field of Classification Search
CPC ........... F16D 48/064; F16D 2500/1024; F16D 2500/3021
See application file for complete search history.

(56) References Cited

U.S. PATENT DOCUMENTS

| | | | |
|---|---|---|---|
| 2010/0163333 A1* | 7/2010 | Patil | B62D 15/0215 180/402 |
| 2014/0105768 A1* | 4/2014 | Franz | F04B 9/02 417/415 |
| 2015/0160042 A1* | 6/2015 | Bogos | G01D 5/20 324/207.15 |

FOREIGN PATENT DOCUMENTS

| | | |
|---|---|---|
| CN | 104205613 A | 12/2014 |
| DE | 10202004007346 U1 | 7/2004 |
| DE | 102010047801 A1 | 5/2011 |
| DE | 102013205905 A1 | 10/2013 |

\* cited by examiner

ANGLE-MEASURING DEVICE FOR A ROTATIONALLY DRIVEN LINEAR ACTUATOR

CROSS-REFERENCE TO RELATED APPLICATIONS

This application is the U.S. National Phase of PCT/DE2016/200392 filed Aug. 24, 2016, which claims priority to DE 102015216509.4 filed Aug. 28, 2015, the entire disclosures of which are incorporated by reference herein.

TECHNICAL FIELD

This disclosure relates to an angular position measuring device for a rotationally driven linear actuator and to a rotationally driven linear actuator, in particular for a clutch actuator, and to a clutch actuator, and a friction clutch, in particular for a motor vehicle.

BACKGROUND

Linear actuators, in particular spindle actuators, for hydrostatic master units are known from the prior art, in particular for an actuating device of a friction clutch of a motor vehicle. For example, hydrostatic master units are known in the form of coupling actuators for the hydraulic actuation of a friction clutch, which include, for this purpose, the master cylinder of a hydrostatic actuating system. In the case of a hydrostatic clutch actuator, a master cylinder is generally provided for accommodating a hydraulic fluid, wherein the accommodation volume can be changed via a master piston. The master piston is translationally moved in the master cylinder, thereby changing the accommodation volume of the master cylinder. In order to control the change in volume, a rotary (e.g. electric) drive may be utilized, and the rotational motion is converted into a translational motion of the master piston via a spindle drive. In one variant, a rotationally fixed spindle nut is translationally moved via a drive spindle. Reference is made in this regard to DE 10 2010 047 801 A1, for example. Yet another variant is known from WO 2011/050 766 A1, in which a master piston is situated in a master cylinder and is translationally fixed to a drive spindle, wherein the rotary drive is converted, therein via a planetary screw drive (PWG), this rotation into a translational motion of the drive spindle and, therefore, of the master piston.

In order to control or regulate the position of the linear actuator element (for example, a spindle nut or a drive spindle) of a linear actuator, for example the master piston, a translational absolute displacement sensor, for example, is utilized in the prior art for measuring the translational absolute displacement position directly at the linear actuator element. Such an absolute displacement sensor can unambiguously establish the position in which the linear actuator element is located, at any time during operation, via a direct (linear) measurement, without a need for a further reference for this purpose. The absolute displacement sensor is expensive and, in addition, is usually only spatially separated from the measurement electronics system and, therefore, can often be integrated into a linear actuator via additional plug connections, which require a great deal of installation space, and/or via more complex casings.

In addition, a configuration is known, in which all that is provided is a rotor position sensor (or angle sensor). In this case, the position of the linear actuator element is deduced at the level of the read-out electronics system or the evaluation electronics system, incrementally by counting every complete revolution of the rotary drive and indirectly by calculating the geometric relationship between the thread pitch and the relative translational displacement between the spindle nut and the drive spindle. In this configuration, it is necessary to provide at least one reference stop or one reference sensor, in the case of which a zero position is defined. This means that, in the case of a (memory) loss of the controller or in the case of an error during the counting of the full revolutions and, therefore, a loss of the reference to the reference stop, the reference stop or the reference sensor must be approached. A great deal of time is required in this case, in particular due to an additional plausibility check which is usually necessary. The plausibility check is necessary, for example, in order to be able to reliably differentiate a possible sluggishness or other stops from the reference stop. It is also disadvantageous in this case that the mechanical requirements on such an actuator are particularly high, because a high running quality and a high impact resistance for the reference stop are required.

In addition, systems which read out indirectly are known, in the case of which driven measurement shafts are utilized for the read-out. Such systems can be designed in such a way that a reference stop is not required, because assigned to every angular position is a unique measurement value, along the entire displacement path of the linear actuator element in some embodiments. With respect to linear actuators in particular, in which a central component (for example a translationally moved drive spindle) prevents a central measuring magnet rotating together with the rotor from being provided, at least one mechanically connected, off-axis measurement shaft has been previously used. As a result, inaccuracies in the mechanical transmission, for example via gears, are accepted and/or a high production precision and assembly precision are required.

Proceeding herefrom, the problem addressed by the prevent disclosure is that of at least partially overcoming the disadvantages known from the prior art. The features according to the disclosure become apparent from the independent claims, for which further embodiments are described in the dependent claims. The features of the claims can be combined in any technically meaningful way, wherein the explanations from the following description as well as features from the figures, which include further embodiments of the disclosure, can also be utilized therefor.

SUMMARY

In an embodiment of this disclosure, an angular position measuring device for a rotationally driven linear actuator is provided, in particular for a clutch actuator, which includes at least the following components:
- a rotor element having a rotational axis which rotates concentrically with a rotor of a rotary drive for an axially movable linear actuator element;
- a first measuring magnet arrangement which is fixed relative to the rotor element and has a polarization, wherein the polarization is oriented in such a way that the magnetic field lines can change with a rotation of the rotor element so as to enable the angle to be precisely determined from at least one measurement position;
- at one of the measuring positions, a 360° sensor for measuring angular positions (proceeding from a predetermined zero-angle position) based on the measuring magnet arrangement;

at one of the measurement positions, a revolution-counting sensor for counting an absolute number of revolutions carried out (proceeding from a predetermined axial zero position) based on the measuring magnet arrangement.

The angular position measuring device proposed herein is designed, above all, for measuring the present angular position of a rotary drive of a linear actuator. The primary objective in this case is to measure an absolute angular position which is greater than 360°.

The proposed angular position measuring device is suitable, in particular, for linear actuators comprising a linear actuator element which carries out a linear motion in an angle-preserving manner. This means, a present axial position of the linear actuator element is assigned to every angular position in a manner which is sufficiently accurately mechanically ensured. Such a linear actuator element is, for example, a drive spindle or a spindle nut, wherein the spindle nut comprises a ball screw drive or a true-pitch planetary screw drive. In such a use of the angular position measuring device, no additional measurements are necessary in order to detect the axial position of the linear actuator element, even when a high adjustment precision is required. Rather, the present absolute axial position of the linear actuator element is calculated indirectly via the detection of the present absolute angle (in an angular range of more than 360°) via the angular position measuring device. Particularly, such a linear actuator may be utilized as a clutch actuator for a friction clutch, in the case of which the present axial position of the linear actuator element, i.e., for example, of the master piston, in particular in a hydrostatic clutch actuator, is required with high precision, in order to meet the requirements on a clutch behavior of a friction clutch.

The angular position measuring device includes, in this case, a rotor element which rotates concentrically with the rotary drive. Particularly, the rotor element may be designed to be integral with the rotor of the rotary drive.

In addition, a measuring magnet arrangement is provided, the magnetic field lines of which are configured for measuring the angular position of the rotor element via at least one sensor. For this purpose, the measuring magnet arrangement is fixed with the rotor element and the field lines extend in such a way that the angular position of the rotor element can be unambiguously measured on the basis of a measurement position. For example, at least one portion of the field lines extends in a plane, with respect to which the rotational axis of the rotor element extends in a normal, i.e., orthogonal orientation. For example, the north pole and the south pole are offset by 180° with respect to each other along a diameter of the rotor element, i.e., they are diametrically opposed to each other. The angular position measuring device comprises, in this case, a 360° sensor, which is also referred to as a single-turn sensor, at a (first) measurement position, i.e., at which the magnetic field lines can therefore be detected for unambiguously determining the angular position of the rotor element. Said sensor measures, within a single full revolution (360°), the present angular position of the rotor element for the regulation or control with a sufficiently fine graduation. Without an additional (counting) measurement electronics system, however, the 360° sensor is not capable of detecting the number of the present revolution proceeding from a predetermined axial zero position. The 360° sensor only detects values between 0° and 360°, and therefore, for example, 361° is detected and output as 1°.

In addition, a revolution-counting sensor is provided, which, at a (second) measurement position may deviate from the (first) measurement position of the 360° sensor, is designed for cumulatively counting the absolute number of revolutions carried out proceeding from a predetermined axial zero position. The revolution-counting sensor is also referred to as a multiturn sensor. The revolution-counting sensor is designed, in this case, in such a way that no additional measurement electronics systems are necessary in order to count the absolute number of revolutions carried out. Rather, the revolution-counting sensor is comparable to an accumulator which is charged via a positive direction of rotation and is discharged via a negative direction of rotation, and therefore the present state of charge of the accumulator, i.e., of the revolution-counting sensor, represents a number of revolutions which can be unambiguously read out using measurement technology. In the case of a failure of a power supply and/or of the read-out electronics system or the evaluation electronics system, the absolute number of current revolutions is not lost and can still be read out.

A predetermined axial zero position is established during assembly, for example. The predetermined axial zero position may be the fully retracted or fully extended position along the (maximum) displacement travel of a linear actuator element.

The polarization or the orientation of the field lines may be configured in such a way that a shortest north-south connecting field line, proceeding from a predetermined zero-angle position, extends parallel to a diametric with respect to the rotational axis through 0° and 180°. The predetermined zero-angle position may be situated at a predetermined axial zero position as described above.

According to one advantageous embodiment of the angular position measuring device, the measuring magnet arrangement comprises an annular magnet which is situated concentric to the rotational axis of the rotor element.

In the case of linear actuators, in particular, in which a central component (for example, a translationally moved drive spindle) prevents a central measuring magnet rotating together with the rotor from being provided, it is proposed herein to utilize a measuring magnet arrangement comprising an annular magnet, for example for the motor commutation for the rotary drive. Therefore, the present angular position can be measured at any time, such as at a single measurement position, with little effort, via a 360° sensor. For example, for an arrangement requiring a particularly small amount of space, the annular magnet can also be utilized for counting the absolute number of revolutions carried out, via the revolution-counting sensor.

According to one advantageous embodiment of the angular position measuring device, the measuring magnet arrangement comprises a measuring magnet pair including two magnet pairs and is provided for the revolution-counting sensor, wherein the magnet pairs (of the measuring magnet pair) are situated on a ring which is concentric to the rotational axis, such as opposite each other in each case, and their polarization is oriented in the same direction.

The concentric ring does not necessarily need to be a structural element in this case. Instead, an imaginary ring can also be formed, having the diameter of the distance between the particular magnet pairs of a measuring magnet pair intersecting the rotational axis of the rotor element. Due to the orientation in the same direction, in the case of one of the magnet pairs, the south pole is oriented radially inward and the north pole is oriented radially outward and, in the other magnet pair, conversely, the south pole is oriented radially outward and the north pole is oriented radially inward.

For many applications, in particular comprising an axially moved drive spindle, an off-axis design is necessary for the determination of the absolute angular position via a revolution-counting sensor; this means the revolution-counting sensor is situated parallel to and spaced apart from the central axis of the rotor. The magnetic field of an annular magnet is not precise enough for a reliable function of the revolution-counting sensor in many applications due to the installation space-related distance between the annular magnet and the revolution-counting sensor, because only one narrow band of magnetic field strength is possible in the case of an annular magnet. As a result of the detected polarization, which alternates in one direction of rotation, of the magnet pairs moving past the revolution-counting sensor in alternation, the revolution-counting sensor is correspondingly charged and discharged.

According to one advantageous embodiment of the angular position measuring device, at least one guide-plate pair is provided, which is magnetizable and is fixed relative to the revolution-counting sensor, wherein the guide plates of the guide-plate pair are situated relative to the at least one measuring magnet of the measuring magnet arrangement in such a way that the guide plates can be oppositely polarized via the at least one measuring magnet, such as via one of the magnet pairs of the measuring magnet pair as described above.

Most revolution-counting sensors are sensitive to a change in the magnetic flux density. The magnetic flux density decreases with distance in a manner depending on the material. The rotor, in particular an electric drive, often has axial play. The rotor element connected to the rotor therefore likewise has axial play. Therefore, the magnetic field strength detectable by the revolution-counting sensor can fluctuate. In many cases, in particular for a low-cost production without an expensive axial preloading of the rotor, the fluctuation is so great that the revolution-counting sensor outputs no reliable data at least across the entire displacement travel.

In this case, it is now proposed to reduce the decrease in the magnetic flux density through the conducting material the magnetic flux density only indirectly via a magnetizable guide-plate pair toward the revolution-counting sensor. In this case, the guide plates may be radially and axially as close as possible to and partially axially overlap at least one measuring magnet of the measuring magnet arrangement designed for this revolution-counting arrangement, such as a measuring magnet pair as described above. The magnetic flux density (T: Tesla), which is transmitted via the guide plates toward the revolution-counting sensor, is at least one order of magnitude greater in this case, for example, than the magnetic flux density would be without the guide-plate pair, for example in air, at the relevant measurement position. Therefore, the cumulative effect at the revolution-counting sensor is stabilized by the magnetizable guide plates via (nearly) revolution-constant magnetic exposure, and the read-out becomes reliable for measuring purposes, without the need to reduce the axial play of the rotor.

In one embodiment, the guide plates are designed in such a way that the guide plates are magnetically saturated, in least in one angular position, when radially overlapped by the relevant (single) measuring magnet, in the case of an off-center single magnet, or provided there is radial overlap of the north orientation or the south orientation in the case of an annular magnet. The axial overlap may be designed in such a way that an axial positional tolerance of the rotor and, therefore, of the magnets is compensated for. The material strength and the width of the guide plates are selected in such a way that the guide plates are always in magnetic saturation, independently of the axial position of the measuring magnets, the temperature, and other effects, as soon as a relevant measuring magnet is located within the guide plates. A mounting tolerance of the guide plates with respect to the circuit board and, therefore, with respect to the revolution-counting sensor can be effectively limited by way of production and assembly, and therefore a stable magnetic field which is only slightly subject to tolerance can be provided for the sensor.

According to at least a few of the aforementioned measures, it is ensured that the magnetic flux density transmitted to the revolution-counting sensor is influenced depending only on the revolution of the rotor element.

According to yet another aspect of this disclosure, a linear actuator is provided, which is rotationally driven, in particular for a clutch actuator, wherein the linear actuator includes at least the following components:

a rotary drive comprising a stator and a rotor, wherein the rotor can rotate about a rotational axis;

a linear actuator element which can move axially parallel to, or along, the rotational axis, in an angle-preserving manner, via a rotation of the rotor;

an angular position measuring device according to one embodiment as described above, wherein the rotor element is fixed relative to the rotor and the sensors are fixed relative to the stator.

In the case of the linear actuator proposed herein, a rotational motion of the rotor is converted into a linear motion of the linear actuator element, parallel to or along the rotational axis of the rotor. The conversion may be angle-preserving in this case and, in the case of a spindle drive, has true pitch, and therefore a detected rotation in any position of a known conversion exactly corresponds to an axial position of the linear actuator element, and therefore this can be exactly calculated. A ball screw drive or a true-pitch planetary screw drive are particularly suitable for this purpose. Axial play can occur between the stator and the rotor. Optionally, slip can also occur between the stator and the rotor in the circumferential direction, because the motion of the rotor is detected here directly via the conjointly rotating rotor element and the measuring magnet arrangement. In this case, the stator forms, indirectly or directly, the rotary abutment for the linear actuator element. An absolute displacement measurement is therefore made possible, which can be reliably read out by a measurement electronics system.

According to one advantageous embodiment of the linear actuator, the guide plates according to one embodiment as described above are integrated into the stator, such as being injected therein.

A particularly simple design of the angular position measuring device is therefore proposed, in the case of which the guide plate is an integral component of the stator. The sensors and the measurement electronics system may be separate components in this case, which may be situated on a shared circuit board. The guide plates may have a metal core and comprise a plastic casing.

The distance between the guide plates and the revolution-counting sensor can be easily adjusted within the tolerances in this case, and the setting is constant for the duration of the service life of the linear actuator. Measurement artifacts or aging effects resulting from thermal effects and/or an influence of an increase in the axial play of the rotor can therefore be avoided.

According to yet another aspect of this disclosure, a hydrostatic clutch actuator for a friction clutch is proposed, wherein the clutch actuator includes at least the following components:
- a linear actuator according to one embodiment as described above,
- a master piston which can be fixedly connected to the linear actuator element for translational motion; and
- a master cylinder for accommodating the master piston and a hydraulic fluid, wherein the master cylinder can be connected to a slave cylinder in a communicating manner via the hydraulic fluid.

The hydrostatic clutch actuator proposed herein is designed, in particular, for the precise and rapid hydrostatic actuation of a friction clutch. To this end, a rotary drive, such as an electric motor, is provided, by which a linear actuator element can be moved. A spindle drive may be provided with a rotationally fixed and translationally movable drive spindle which is fixed so as to be translationally connected to a master piston. To this end, an axially fixed spindle nut, comprising one (true-pitch) planetary screw drive, is provided, which rotates together with the rotor of the drive and, therefore, axially moves the drive spindle. During one (single) full revolution of the rotor, the drive spindle may be translationally moved by the amount of its thread pitch. In one alternative embodiment, the spindle nut comprises a step-up or step-down gearbox, and therefore the gearbox is translationally moved by the amount of the thread pitch of the drive spindle during one full revolution of the rotor, but the drive spindle is translationally moved more or less by this motion in a different way depending on the transmission ratio.

The master cylinder forms a cylinder volume and has, on one side, a piston opening, into which the master piston can be introduced. The master piston can move translationally in the master cylinder and the piston opening is sealed by the master piston with respect to adjoining surroundings at least during pressure operation. In addition, the master cylinder has a line opening, through which a hydraulic fluid can flow out and in, and therefore, in a hydrostatic actuating system, the slave piston in the slave cylinder can be actuated. In one embodiment, the master cylinder is formed so as to be integral with the linear actuator element.

In one embodiment, the measurement electronics system and the measuring magnet arrangement, are situated, encapsulated, in a dry space. Alternatively, at least the lubrication of the drive spindle is not separated from the measuring magnet arrangement, and also not from the sensors.

According to yet another aspect of this disclosure, a friction clutch comprising a coupling axle for detachably connecting a driven shaft to a drive train is proposed, which includes at least the following components:
- at least one friction pack comprising at least one friction plate and at least one corresponding friction disk, via which, in the compressed state, torque can be transmitted;
- at least one actuating device comprising a slave cylinder for compressing the at least one friction pack; and
- at least one hydrostatic clutch actuator, which can be connected to the slave cylinder in a communicating manner, according to one embodiment as described above.

The friction clutch is designed for detachably transferring torque from a driven shaft to a load, and vice versa. This is generally achieved via the (at least one) friction pack which comprises an axially displaceable pressure plate which is generally rotationally fixed with the driven shaft and which can be pressed against at least one corresponding friction disk. Due to the pressing force, a friction force results over the friction surface, which, multiplied by the mean radius of the friction surface, results in a transmissible torque.

For many applications, it is advantageous to hydraulically actuate the friction pack, because, as a result, greater contact pressures can be achieved or an automated actuation can be implemented in a well controlled manner. In many embodiments, an actuating spring is also provided in this case, for example, a disk spring, between the pressure plate and an actuating piston, i.e., the slave piston. The actuating piston is hydraulic, i.e., translationally movable via a change in the actuating volume in the slave cylinder. If the actuating volume is increased, for example, the actuating piston is moved in the pressing direction and, therefore, a pressing force is exerted onto the pressure plate and, therefore, onto the friction pack. If the actuating volume is reduced in this example, the actuating piston is moved back and, therefore, the (complete) transmission of a torque via the friction clutch is interrupted. The actuating volume of the slave cylinder is controlled via the master piston and the accommodation volume in the master cylinder.

In this case, it is now proposed to utilize the hydrostatic clutch actuator, according to one embodiment as described above, as a master unit comprising the master cylinder, i.e., the master cylinder, and the master piston, i.e., the master piston. The advantage of this hydrostatic clutch actuator is that it has a particularly simple and highly reliable design of the measurement electronics system, which is determinable the position of the master piston in the case of a failure of the power supply and/or a system crash.

Many components of the hydrostatic clutch actuator may be identical to the conventional hydrostatic clutch actuator comprising a translationally moved drive spindle, in particular the electric motor, the control electronics system including control technology, the electrical and/or hydraulic connections and accesses, the motor housing, the rolling element bearings, optionally the planetary screw drive.

According to yet another aspect of this disclosure, a drive train for a motor vehicle is provided, which comprises a drive unit including a driven shaft and a friction clutch as described above, wherein the driven shaft can be detachably connected to at least one load in order to transmit torque via the friction clutch.

The drive train is designed for transmitting a torque which has been provided by a drive unit, for example an energy conversion machine, such as an internal combustion engine or an electrical drive machine, and output via its driven shaft, for at least one load, in a detachable manner, i.e., in an engageable and disengageable manner. An exemplary load is at least one drive wheel of a motor vehicle and/or an electrical generator for providing electrical energy. Conversely, a consumption of inertial energy introduced by a drive wheel, for example, can also be converted. The at least one drive wheel then forms the drive unit, wherein its inertial energy can be transmitted via the friction clutch to an electrical generator for recuperation, i.e., for the electrical storage of the braking energy, with a suitably designed drive train. In addition, in one embodiment, a plurality of drive units is provided, which can be operated via the friction clutch, connected in series or in parallel or decoupled from each other, and the torque of which can be detachably provided for use. Examples are hybrid drives comprising an electrical drive machine and an internal combustion engine, but also multi-cylinder engines, in the case of which individual cylinders (cylinder groups) can be engaged.

The use of the above-described friction clutch is particularly advantageous in order to transfer the torque in a targeted manner and/or by a shifting gearbox having different gear ratios or to interrupt a transmission of the torque. The actuating device designed for the friction clutch proposed herein, in particular the clutch actuator, has a particularly small installation volume and, simultaneously, can be read out at any time, independently of power supply failures in the measurement electronics system, and therefore the absolute position of the master piston can be detected.

According to yet another aspect of this disclosure, a motor vehicle is proposed, which comprises at least one drive wheel which can be driven by a drive train as described above.

Most motor vehicles today comprise a front drive and therefore may have the drive unit, for example an internal combustion engine or an electrical drive machine, situated ahead of the driver's cabin and transversely to the main direction of travel. In such an arrangement, in particular, the installation space is particularly small and it is therefore particularly advantageous to utilize a friction clutch having a small overall size. The use of a friction clutch in motorized bicycles is similarly designed, in the case of which substantially increased performance is required in an installation space which remains the same.

This set of problems is exacerbated in the case of passenger cars in the small car segment according to the European classification. The units utilized in a passenger car in the small car segment are not substantially smaller than is the case with passenger cars of larger car segments. Nevertheless, the installation space available in small cars is substantially less. The above-described drive train comprises a friction clutch and a hydrostatic clutch actuator having a particularly small overall size. Simultaneously, the absolute position of the master piston can be detected at any time, independently of power supply failures in the measurement electronics system.

Passenger cars are assigned to a vehicle class according to, for example, size, price, weight, and power, wherein this definition is subject to constant change depending on the needs of the market. In the U.S. market, vehicles in the small-car and subcompact-car classes according to the European classification are assigned to the subcompact car class and, in the British market, they correspond to the supermini class or the city car class. Examples of the subcompact car class are a Volkswagen up! or a Renault Twingo. Examples of the small car class are an Alfa Romeo Mito, Volkswagen Polo, Ford Fiesta or Renault Clio.

BRIEF DESCRIPTION OF THE DRAWINGS

This disclosure is explained in detail in light of the relevant technical background with reference to the associated drawings which show some embodiments. This disclosure is in no way limited by the purely schematic drawings, wherein it is to be noted that the drawings are not true to scale and are not suitable for defining size ratios. In the drawings.

DETAILED DESCRIPTION OF THE DRAWINGS

Figure 1:
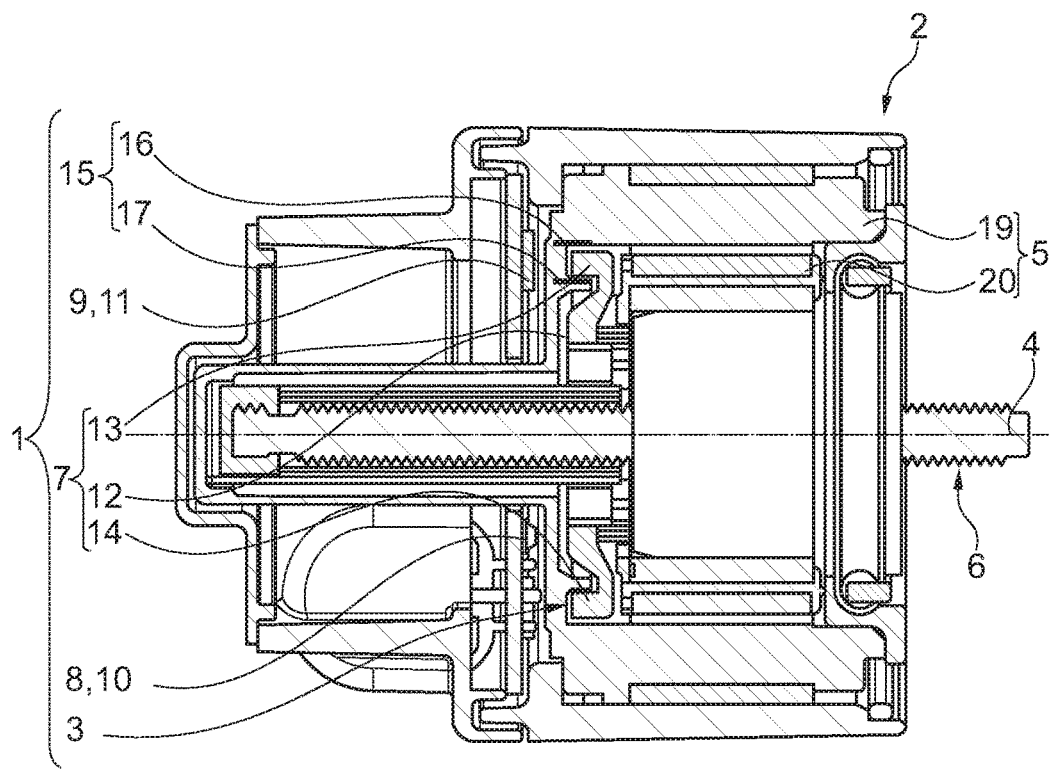
FIG. 1 shows a section view of a linear actuator comprising an angular position measuring device.
Figure 2:
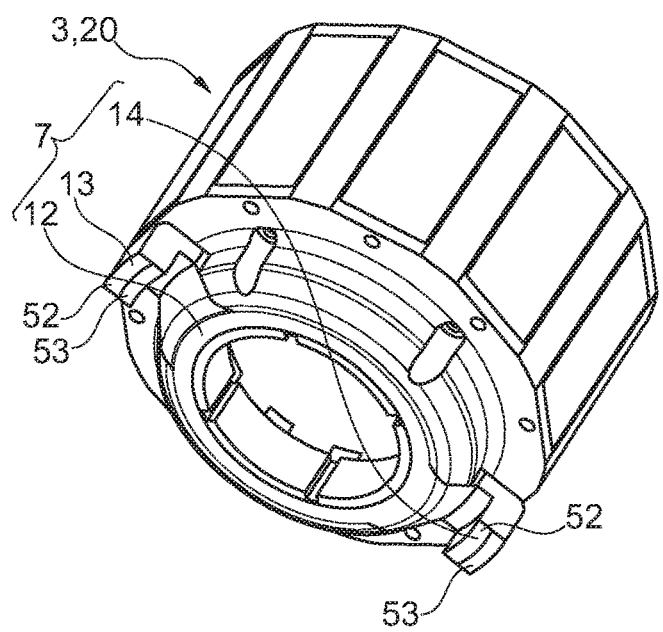
FIG. 2 shows a spatial view of a rotor element on a rotor.

FIG. 1 shows an angular position measuring device 1 in a linear actuator 2 which is shown here in a section view. In this case, a drive spindle, which forms a linear actuator element 6, can be moved along the rotational axis 4 of the drive 5 translationally, i.e., from left to right and back again in this representation. The drive 5 comprises a stator 19 in this case, which is rotationally fixed and a rotor 20 which can rotate about the rotational axis 4 in a controlled manner. A rotor element 3 is rotationally fixed with the rotor 20, i.e., fixed thereto for conjoint rotation. This rotation of the rotor 20 can be converted, for example, by a planetary screw drive, into the translational motion of the linear actuator element 6 (the drive spindle in this case). The angular position measuring device 1 comprises, in this case, an annular magnet 12, a first magnet pair 13, and a second magnet pair 14 which together form the measuring magnet arrangement 7. The annular magnet 12 may have a polarization in this case, i.e., a magnetic north-south orientation, which lies in a plane, with respect to which the rotational axis 4 is normal. The magnet pairs 13 and 14 are oriented in the same direction, as represented in the following in FIG. 2. A first guide plate 16 and a second guide plate 17 are located so as to axially overlap and are radially outer and radially inner, respectively, and together form a guide plate pair 15. By way of a polarization of the first magnet pair 13 as represented in FIG. 2, the first guide plate 16 is in saturation (for example, north pole) and the second guide plate 17 is in saturation (for example, south pole or reversed polarization). Therefore, the magnetic flux density at the second measurement position 9, at which the revolution-counting sensor 11 is located, is always the same in this position of the rotor element 3 and the evaluation can be reliably read out by the revolution-counting sensor 11. At the first measurement position 8, the present angular position within a number of revolutions counted by the revolution-counting sensor 11 can be detected, by the 360° sensor 10 via the magnetic field of the annular magnet 12, in a manner which has a sufficiently fine graduation for motor commutation.

A rotor element 3 is represented in FIG. 2, which is formed in this case so as to be integral with the rotor 20, as it is represented in FIG. 1 by way of example. In this case, the measuring magnet arrangement 7 is likewise formed with an annular magnet 12, a first magnet pair 13, and a second magnet pair 14. The first magnet pair 13 has, in this case, a polarization which is oriented in such a way that the north pole 52 is radially outer and the south pole 53 is radially inner. The second magnet pair 14 has, in this case, a polarization which is oriented in such a way that the north pole 52 is radially inner and the south pole 53 is radially outer. Therefore, the first magnet pair 13 and the second magnet pair 14 are oriented in the same direction, and, in this case, are also diametrically situated, i.e., offset by 180°.

Figure 3:
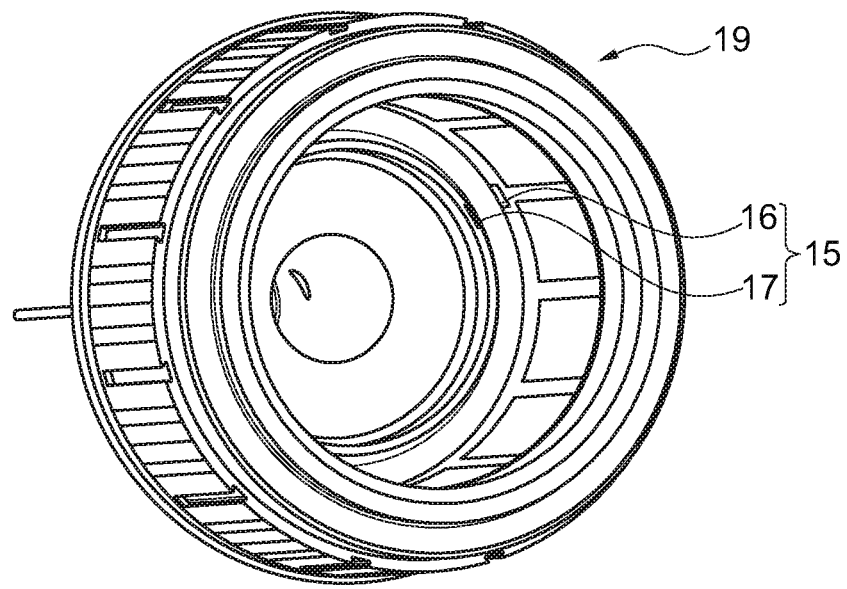
FIG. 3 shows a spatial view of a stator.

FIG. 3 shows a stator 19, wherein it is apparent here that the guide plate pair 15, comprising a first (encased) guide plate 16 and a second (encased) guide plate 17, is integrated into the stator, for example being injected therein.

Figure 4:
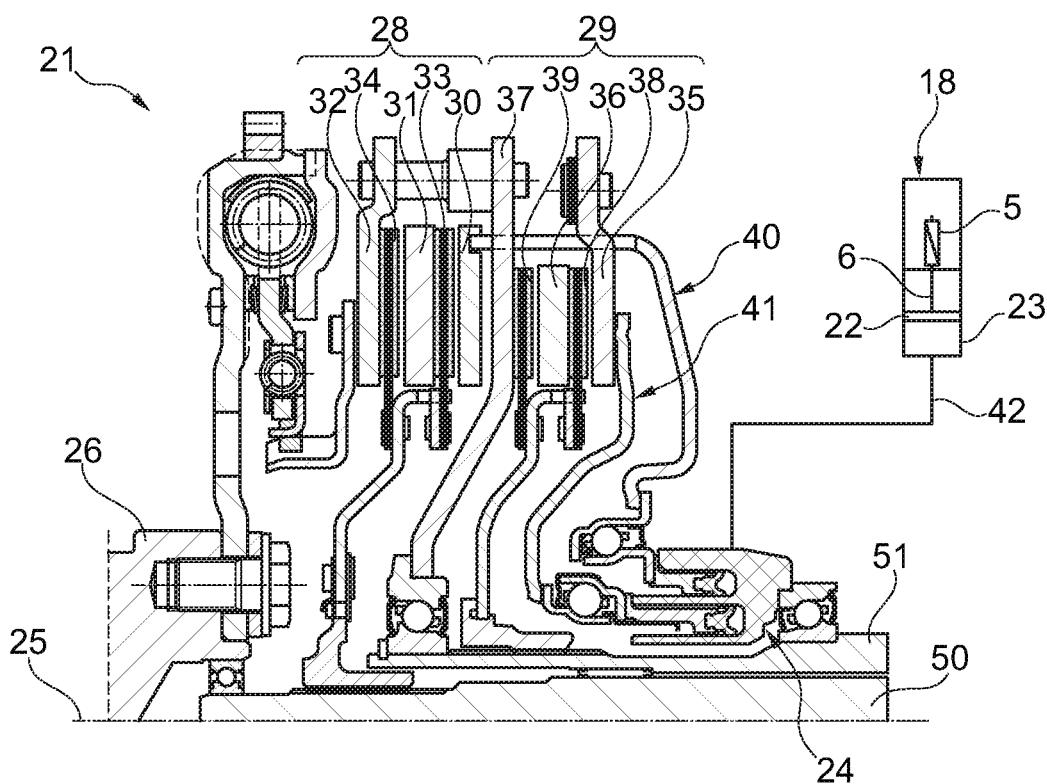
FIG. 4 shows a section view of a dry double clutch.

FIG. 4 shows, by way of example, a friction clutch 21 as a (dry) double clutch comprising a first friction pack 28 and a second friction pack 29 which can be actuated via a slave cylinder 24 including a first actuating piston 40 and including a second actuating piston 41, respectively. Via the driven shaft 26, a torque can be input via the coupling axle 25, which can be detachably transmitted via the first friction pack 28 to a first output shaft 50 and via the second friction pack 29 to a second output shaft 51. The first friction pack 28 is formed, in this case, from multiple friction plates, namely a first pressure plate 30, a first intermediate plate 31, and a first counter plate 32, and, in this case, from multiple friction disks, namely a first pressure friction disk 33 and a first counter friction disk 34, for which clutch disks can also be utilized. The second friction pack 29 is likewise formed, in this case, from multiple friction plates, namely a second pressure plate 35, a second intermediate plate 36, and a second counter plate 37, and, in this case, from multiple friction disks, namely a second pressure friction disk 38 and a second counter friction disk 39, for which clutch disks can also be utilized. The friction packs 28 and 29 can be actuated by a hydrostatic clutch actuator 18 (master unit), which is represented here purely schematically, via a hydraulic line 42, for example in an automated manner. To this end, the master piston 22 in the master cylinder 23 can be moved back and forth via a linear actuator element 6 driven by a rotary drive 5, and therefore a hydraulic fluid in the master cylinder 23 is displaced and is pressed into a corresponding chamber of the slave cylinder 24. As a result, the first friction pack 28 and the second friction pack 29 are compressed and a torque from the driven shaft 26 can be frictionally transmitted to the particular output shaft 50 and 51, respectively.

Figure 5:
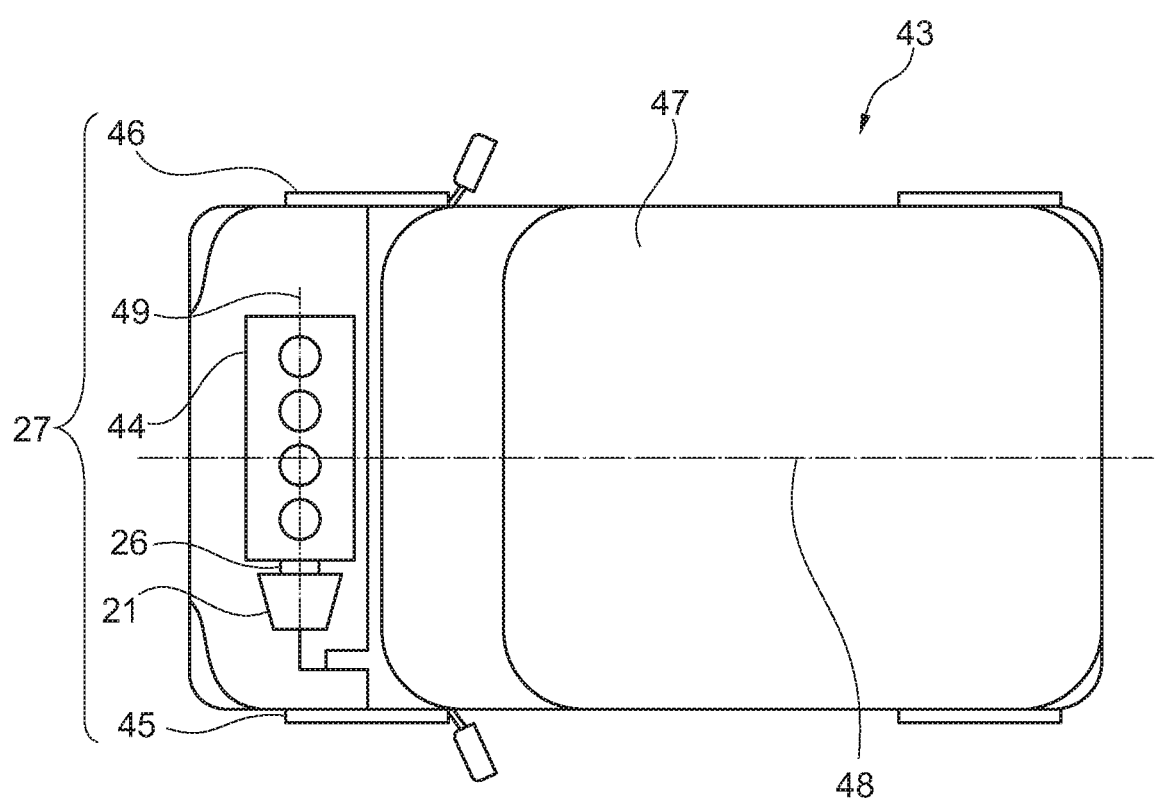
FIG. 5 shows a schematic view of a drive train in a motor vehicle.

FIG. 5 shows a schematic representation of a drive train 27, comprising a drive unit 44, which is represented here as an internal combustion engine, and comprising a driven shaft 26, a friction clutch 21, and a left drive wheel 45 and a right drive wheel 46, each of which is connected in a torque-transmitting manner. The drive train 27 is situated in a motor vehicle 43 in this case, wherein the drive unit 44 is situated with its engine axis 49 transversely to the longitudinal axis 48, ahead of the driver's cabin 47.

The angular position measuring device proposed herein ensures a fail-safe read-out of the absolute displacement position of, for example, a master piston of a hydrostatic clutch actuator, and requires little installation space.

LIST OF REFERENCE SIGNS 1 angular position measuring device
2 linear actuator
3 rotor element
4 rotational axis
5 drive
6 linear actuator element
7 measuring magnet arrangement
8 first measurement position
9 second measurement position
10 360° sensor
11 revolution-counting sensor
12 annular magnet
13 first magnet pair
14 second magnet pair
15 guide-plate pair
16 first guide plate
17 second guide plate
18 clutch actuator
19 stator
20 rotor
21 friction clutch
22 master piston
23 master cylinder
24 slave cylinder
25 coupling axle
26 driven shaft
27 drive train
28 first friction pack
29 second friction pack
30 first pressure plate
31 first intermediate plate
32 first counter plate
33 first pressure friction disk
34 first counter friction disk
35 second pressure plate
36 second intermediate plate
37 second counter plate
38 second pressure friction disk
39 second counter friction disk
40 first actuating device
41 second actuating device
42 hydraulic line
43 motor vehicle
44 drive unit
45 left drive wheel
46 right drive wheel
47 driver's cabin
48 longitudinal axis
49 engine axis
50 first output shaft
51 second output shaft
52 north pole
53 south pole

The invention claimed is:

1. An angular position measuring device for a rotationally driven linear clutch actuator, the angular position measuring device comprising:
   a rotor element having a rotational axis which rotates concentrically with a rotor of a rotary drive for an axially movable linear actuator element;
   a first measuring magnet arrangement which is fixed relative to the rotor element and has a polarization, wherein the polarization is oriented such that magnetic field lines can change with a rotation of the rotor element so as to enable an angle to be determined from at least one measurement position;
   at one of the at least one measurement position, a 360-degree sensor for measuring angular positions based on the first measuring magnet arrangement is located; and
   at one of the at least one measurement position, a revolution-counting sensor for counting an absolute number of revolutions carried out based on the measuring magnet arrangement is located;
   wherein the measuring magnet arrangement comprises a measuring magnet pair including two magnets and is provided for the revolution-counting sensor, wherein the magnets are situated opposite each other and on a ring which is concentric to the rotational axis, a polarization of the magnets is oriented in the same direction;
   wherein at least one pair of guide plates is provided, which is magnetizable and is fixed relative to the revolution-counting sensor, wherein the at least one pair of guide plates are situated relative to the magnets such that the guide plates can be oppositely polarized via the magnets.

2. The angular position measuring device as claimed in claim 1, wherein the measuring magnet arrangement includes an annular magnet which is situated concentric to the rotational axis of the rotor element.

3. The linear actuator as claimed in claim 1, wherein the at least one pair of guide plates are integrated via injection into a stator.

4. A hydrostatic clutch actuator for a friction clutch, comprising:
   a linear actuator as claimed in claim 3;
   a master piston which can be fixedly connected to the linear actuator element for translational motion; and a master cylinder for accommodating the master piston and a hydraulic fluid, wherein the master cylinder is fluidly connected via the hydraulic fluid to a slave cylinder.

5. A linear clutch actuator comprising:
a threaded linear actuator element configured to rotate about an axis such that rotation of the threaded linear actuator element causes a linear translation;
a rotor element disposed about the threaded linear actuator element and being configured to rotate concentrically with the threaded linear actuator element;
a measuring magnet arrangement fixed relative to the rotor element and having a polarization and magnetic field lines that change orientation with a rotation of the rotor element;
an angular position measuring device fixed so as to not rotate relative to the rotor element, the angular position measuring device configured to determine an angular position of the rotor element by detecting changes in the magnetic field lines during rotation of the rotor element; and
a revolution-counting sensor fixed so as to not rotate relative to the rotor element, the revolution-counting sensor configured to determine a number of revolutions carried out by the rotor element during rotation based on the measuring magnet arrangement;
wherein the measuring magnet arrangement includes two magnets provided for the revolution-counting sensor, wherein the magnets are situated opposite each other and on a ring which is concentric to the axis, and wherein a polarization of the magnets is oriented in the same direction;
wherein the linear clutch actuator further comprises at least one pair of magnetizable guide plates fixed relative to the revolution-counting sensor, wherein the at least one pair of guide plates are situated relative to at least one of the two magnets in such a way that the guide plates can be oppositely polarized via one of the magnets.

6. The linear clutch actuator of claim 5, wherein the measuring magnet arrangement includes an annular magnet disposed concentric to the axis.

7. The linear clutch actuator of claim 5, further comprising a stator located about the rotor element, wherein the guide plates are disposed in the stator.

8. The linear clutch actuator of claim 5, wherein the threaded linear actuator element is a threaded shaft.

9. The linear clutch actuator of claim 5, wherein the threaded linear actuator element is a threaded nut.

* * * * *